UNITED STATES PATENT OFFICE.

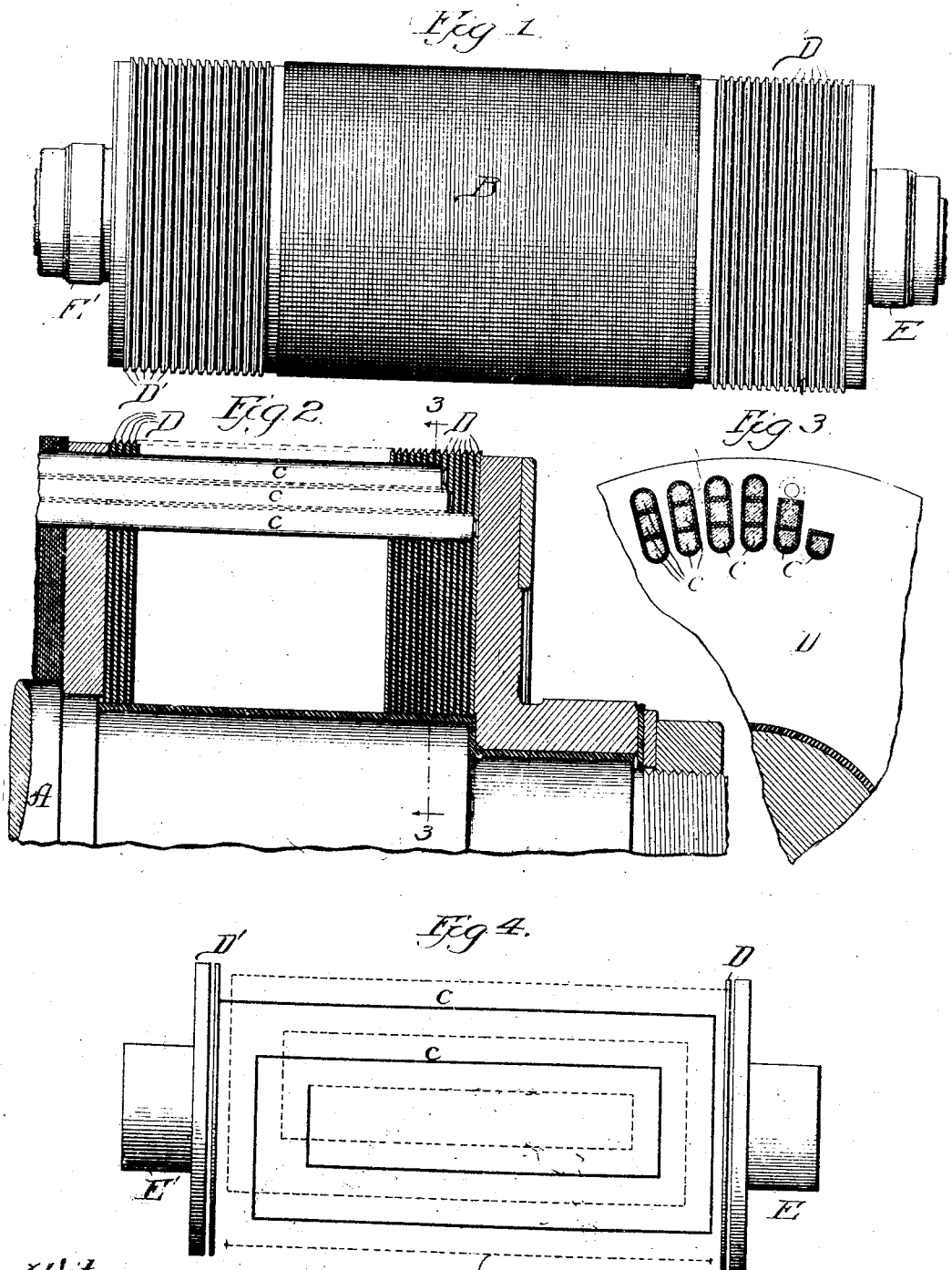

CHARLES H. SMOOT, OF CHICAGO, ILLINOIS, ASSIGNOR, BY MESNE ASSIGNMENTS, TO GENERAL ELECTRIC COMPANY, A CORPORATION OF NEW YORK.

TURBO-GENERATOR CONSTRUCTION.

967,254.  Specification of Letters Patent. Patented Aug. 16, 1910.

Application filed January 2, 1906. Serial No. 294,044.

*To all whom it may concern:*

Be it known that I, CHARLES H. SMOOT, a citizen of the United States, residing at Chicago, in the county of Cook and State of Illinois, have invented a certain new and useful Improvement in Turbo - Generator Construction, of which the following is a full, clear, concise, and exact description.

My invention relates to dynamo - electric machines, and more particularly to generators in which the rotor of the revolving field type of alternator is driven at a very high speed.

The object of my invention is to provide a strong and compact structure possessing the solidity requisite to withstand the enormous centrifugal force to which such rotors are subjected.

In my invention the conductors are embedded in the cylindrical core of the rotary member. Annular members, preferably disks, at each end of the core serve to interconnect the conductors, and also act as retaining pieces for the ends of the same, said conductors being held in place throughout their entire length, embedded in said core and annular members. My invention thus provides a structure in which the conductors are completely buried in a rotary member which presents the external appearance of a simple cylinder. The conductors are thus securely held in place, and injury thereto from centrifugal force effectually prevented.

The use of end disks in armature construction is old, such disks being used merely to interconnect the conductors. Such structures were not designed, however, for high speed electric machines, and the additional important result secured by my invention, namely, the holding of the conductors in place throughout their entire lengths was not attained.

I will describe my invention more particularly by reference to the accompanying drawings, in which, Figure 1 is a side elevation of a rotor embodying my invention; Fig. 2 is a fragmentary longitudinal section thereof; Fig. 3 is a fragmentary cross section on the line 3—3 of Fig. 2; and Fig. 4 is a simplified diagram illustrating a method of winding which may be employed, and, for sake of clearness, showing a winding in which only one conductor is placed in each slot.

Similar letters of reference refer to similar parts throughout the several views.

Upon the shaft A of the rotary member is mounted a core B. The conductors C of the field winding are embedded in this core near its surface, extending longitudinally thereof in slots of a size to receive said conductors. Said core is of a well known construction, being built up of a series of soft iron laminæ or disks. Each disk is provided with an arc-shaped row of slots $c$ on opposite sides of its axis, said disks being arranged with their corresponding slots in alinement. There may be one or more conductors in each slot, as may be deemed desirable.

For purpose of illustration, I have shown radial slots extending longitudinally of the cylindrical core, near the surface thereof, and three conductors arranged in each slot. I do not limit myself, however, to any particular form of slot, or any particular method of securing the conductors beneath the surface of the cylinder.

At each end of the cylindrical core B are a number of disks D, insulated from the core and from each other. All of these disks, except the two at the extreme ends of the rotor, are provided with slots registering with the slots in the core, for the purpose of receiving such of the conductors as may extend therethrough. Each conductor is insulated from all the disks except the one at each end to which it is riveted or otherwise secured. I preferably rivet the end of the conductors to the plates, since such construction provides a close joint, approximating an integral union, offering no increased resistance at this point. As shown in the drawings, electrical connection is made from one conductor to the next through a disk D, the conductors being thus arranged in series with each other. The two disks constituting the terminals of the series are in turn electrically connected to the collector rings E, E', through which current is directed to the windings in the usual manner.

Where a plurality of conductors are arranged in each slot of the core, the radially innermost conductor is connected to a disk which is outside the end conductor disk or disks of the other conductor or conductors in that slot. This is shown most clearly in Fig. 2. This method of connection adds to the strength of the structure, and, in view of the fact that the rotor is especially designed for extremely high speeds, is a desirable feature of my invention. With this structure the longer ends of the conductors are in the position of the least centrifugal action and have the greatest thickness of outerlying disk support. The material of the disk lying between the point of riveting of a conductor and the surface of the cylinder is sufficient to prevent the centrifugal force from tearing it out. If the reverse method of connection were used, each of the inner conductors would be riveted to its disk immediately below the slot through which the other conductors passed, and hence an inner conductor under the influence of the enormous force to which it is subjected in use, would be likely to tear out the thin portions of the disk lying between its riveted end and the slot in its connecting disk, or otherwise injure the joint. Moreover, the method of connection devised by me makes it easier to rivet the conductors to the disks.

While I preferably employ bronze end connector disks, steel disks which possess great strength may be used where deemed desirable.

The form of winding illustrated diagrammatically in Fig. 4 is that more fully described and claimed in a patent to said Hjalmar Hertz, No. 908,098, dated December 29, 1908. In such winding there will necessarily be one more horizontal conductor on one side of the axis of the winding than on the other, due to the fact that the terminals are brought out at opposite ends of the rotor. As indicated at Fig. 4, a dummy conductor $h$ is provided on that side of the axis which has the fewer number of lengths of the actual winding.

In the drawings I have shown a form of structure in which I preferably embody my invention, some of the features of said rotor being no part of my present invention, but forming the subject matter of a joint patent to myself and Hjalmar Hertz, No. 911,081, dated Feb. 2, 1909.

Having thus described my invention, I claim:

1. In a dynamo-electric machine, a rotary member comprising a cylindrical core provided with longitudinally extending slots, a plurality of insulated conductors in each slot, arranged radially side by side, and end disks for interconnecting said conductors, each radially inner conductor being connected to a disk which is outside the end connector disk of the radially outer conductors in the same slot.

2. In a rotor for a dynamo-electric machine, the combination with a cylindrical core having a group of insulated conductors extending longitudinally of the core in a radial slot therein, of end disks for interconnecting said conductors, the radially innermost conductors being connected to the outermost disks respectively, said disks being each provided with a slot corresponding in size to the conductor or conductors passing through the same.

In witness whereof, I, hereunto subscribe my name this 26th day of December A. D., 1905.

CHARLES H. SMOOT.

Witnesses:
 HJALMAR HERTZ,
 GEORGE E. FOLK.